May 26, 1942.    A. F. GREINER    2,284,198
UNIVERSAL JOINT
Filed Dec. 15, 1938
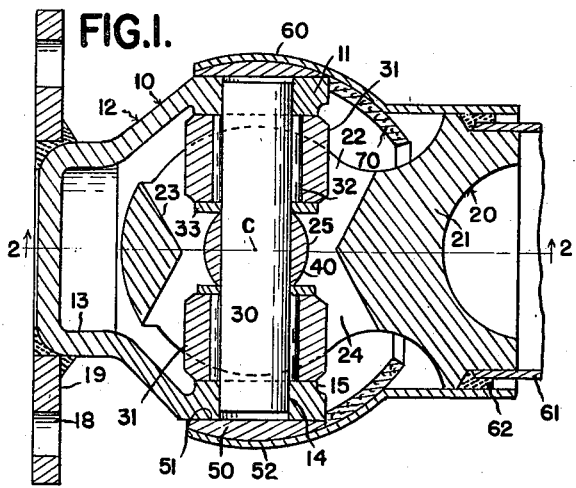
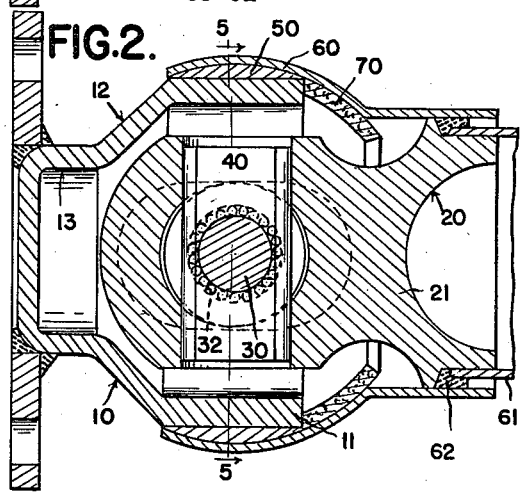
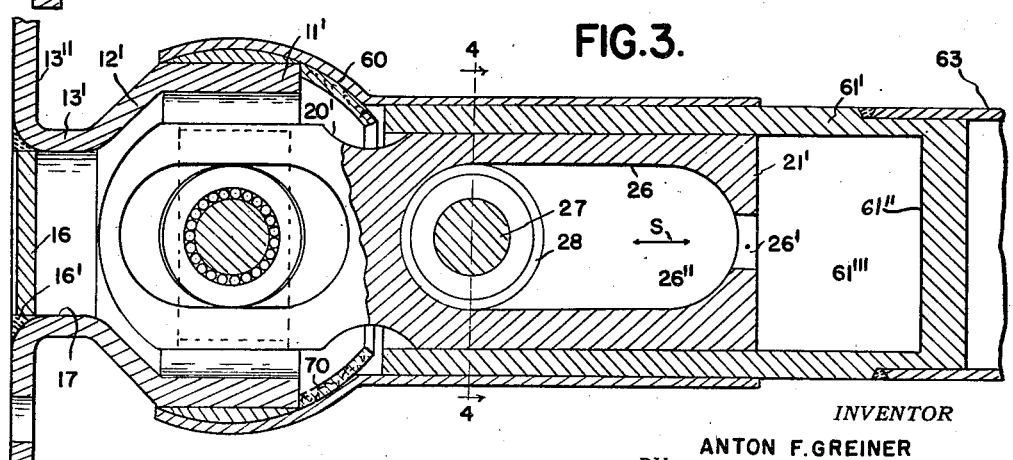
INVENTOR
ANTON F. GREINER
BY Whittemore, Hulbert & Belknap
ATTORNEYS Patented May 26, 1942

2,284,198

UNITED STATES PATENT OFFICE 2,284,198

UNIVERSAL JOINT

Anton F. Greiner, Detroit, Mich.

Application December 15, 1938, Serial No. 245,961

1 Claim. (Cl. 64—17)

The present invention relates to a universal joint and more specifically to a torque transmitting universal joint of increased strength and simplified design.

It is an object of the present invention to provide a universal joint characterized by its extreme simplicity, its strength and its efficiency.

It is a further object of the present invention to provide a universal joint characterized by means providing for torque transmitting elements having exceptionally long torque arms.

It is a further object of the present invention to provide a torque transmitting element intermediate two transverse torque transmitting pins, said element being universally adjustable relative to one of said pins and being longitudinally adjustable relative to the other of said pins.

Other objects of the invention will be apparent as the description proceeds and when taken in conjunction with the accompanying drawing, and wherein Fig. 1 is a longitudinal section through my improved universal joint;

Fig. 2 is a section on the line 2—2, Fig. 1;

Fig. 3 is a partial longitudinal section corresponding somewhat to Figs. 1 and 2 of a slightly different embodiment of my invention;

Fig. 4 is a section on the line 4—4, Fig. 3; and

Fig. 5 is a section on the line 5—5, Fig. 2.

The universal joint embodying the present invention comprises a cup-shaped member generally indicated at 10 having a substantially cylindrical portion 11, a conical portion 12 and a shallow cylindrical cup 13. The cup 10 is apertured as indicated at 14 for a purpose which will presently appear.

At 20 I have indicated generally a torque transmitting member comprising a body portion 21, a pair of longitudinally extending arms 22 and an integral portion 23 interconnecting arms 22. Arms 22 are provided with flat parallel opposed surfaces 24 for a purpose which will presently appear. In addition arms 22 are provided with circular apertures 25.

Received within the apertures 14 and extending between arms 22 I provide a roller pin 30. Flat surfaces 24 are spaced apart a distance substantially greater than the diameter of the roller pin 30 and I provide a pair of rollers 31 which are of a size to be received between surfaces 24. Preferably I also provide a plurality of needle bearings 32 interposed between roller pin 30 and rollers 31.

The cylindrical portion 11 of cup 10 is preferably formed of opposed bosses 15 against which rollers 31 engage. Also in order to retain needle bearings 32 in position, I prefer to employ washers 33.

The relationship between rollers 31, roller pin 30 and the flat parallel opposed surfaces 24 of member 20 are such that during transmission of torque each roller 31 will engage only one of the surfaces 24. This provides for low friction losses inasmuch as the roller 31 may then roll freely in contact with the surface 24 with which it is engaged.

In order to retain element 20 in position, I provide a king pin 40 which, as seen in Figs. 1 and 2, is flattened but is provided with diametrically opposed concentric circular bearing surfaces. Pin 40 is received within the diametrically opposed apertures 25 provided in arms 22 previously referred to. The pin 40 is provided with a central circular aperture for the reception of the roller pin 30 and serves to retain all of the parts in accurately assembled relation.

It should be observed at this time that the geometric center of the elements referred to is at the center of rotation of the assembled universal joint. It should further be observed that I have by the construction described provided a universal joint which is particularly strong and which is capable of universal adjustment without the necessity for machining spherical surfaces on the torque transmitting elements.

The roller pin 30 is retained against axial displacement by means of a ring 50. The ring 50 has a cylindrical inner surface 51 adapted to bear against the outer cylindrical surface of cylindrical portion 11 of the cup 10, and an outer spherical surface 52 which in the assembled relation is slidably engaged by a partly spherically formed shell 60, welded or otherwise secured to member 20 and torque tube 61, as indicated at 62 The ring is locked in place by countersunk screws (not shown) or the like.

At this time attention is directed to the fact that torque is transmitted from the member 10 to the member 20 through the medium of only one pin 30 at points widely removed from the center of rotation indicated at C. By this means relatively large torques may be transmitted without destructive strains being placed upon the elements used as the bending moment arms are relatively short.

At 70 I have illustrated a skirt or shell formed of leather or other suitable material which is adapted to be moved within the interior of the assembled universal joint as will be readily apparent. It is intended that the universal joint disclosed herein shall initially be charged with lubricant and then permanently sealed. Rotation of the joint provides positive feed of lubricant to bearing points and the flow of lubricant also carries heat away from the points of generation. The skirt 70 serves the useful function of retaining lubricant as it is moved centrifugally adjacent the desired point of use. It will be apparent that the skirt 70 must be secured to member 10 for motion therewith, and, if desired, member 10 may be provided with a peripheral groove for the reception of the skirt 70.

In the modification illustrated in Figs. 1 and 2, the cup member generally indicated at 10 is soldered or welded or otherwise secured to a flange 19 provided with apertures 18 for the reception of bolts by the means of which it may be secured to suitable torque transmitting elements.

In Fig. 3 I have illustrated a slightly modified form of my invention. Like reference numerals have been applied to this figure where applicable and the description thereof will be limited solely to points of distinction.

Instead of providing a cup-shaped member such as shown at 10 in Fig. 1, in the present instance I provide a member having a cylindrical portion 11', a conical portion 12', a second reduced cylindrical portion 13' and an outwardly radially extending flange 13''. This arrangement, as will be apparent, leaves a central opening 17, which in this modification is adapted to be closed by a disk 16 welded or soldered or otherwise secured as indicated at 16'.

With this construction, disk or plate 16 may be last assembled and the interior of the assembled universal joint may be charged with suitable lubricant through the opening 17 after which plate 16 may be permanently secured in position.

In this modification I have further illustrated a second adjustment. Member 20' is provided with a body portion 21' having an elongated slot 26 formed therein. The torque element 61' is slidably related to member 20' and has a transverse torque transmitting pin 27 carried diametrically thereof. Pin 27 is provided with a pair of rollers 28 which are adapted to be received within the slot 26 and to serve as torque transmitting members. Rollers 28 may or may not be provided with needle or other bearings as desired.

In this last modification, the shell 60 is of course slidably related to the torque element 61'. I have illustrated a continuation or second torque tube 63 soldered or otherwise secured to the tube 61'.

Another important aspect of this modified universal joint is the provision of means for cushion shock in use. This universal joint may serve to couple two relatively movable members which may move abruptly relative to each other. An example of such a use is in a motor vehicle in which the universal joint is employed to transmit torque to the rear axle. As is fully understood, the rear axle of the motor vehicle rises and falls abruptly during operation, due to unevenness of the road surface, whereby a force of shock proportions in the direction of the arrow S is produced.

According to the present invention the member 20' is formed with a projecting portion 21'. This may be of any suitable shape, but in the present instance is illustrated as being cylindrical. A slidable torque element 61' is provided in torque transmitting relation on the portion 21' and, in addition, is longitudinally slidable thereon.

In order to transmit torque efficiently between the torque element 61' and the member 20', I provide a pin 27 which is adapted to span the torque element 61'. The portion 21' of the member 20' is provided with a transverse slot 26 in which the pin 27 is slidably received. Preferably the pin is provided with a bearing 28 which serves to transmit torque between the pin 27 and the slot 26. As seen in Fig. 3, the bearing 28 substantially fills the slot 26.

As seen in Fig. 3, the torque element 61' is provided with a bottom 61'' which may be integral therewith or which may be a separate member permanently secured thereto. The slot 26 opens laterally in the member 21', and, in addition, a restricted orifice 26' is provided in a direction to open longitudinally outward therefrom. The torque element 61' is adapted to close the slot 26 laterally so as to provide a chamber 26'' therein, which in turn is provided with the restricted orifice 26'. The end plate or bottom 61'' of the torque element 61' in addition cooperates with the structure thus far described to form a second chamber 61''', which communicates with the chamber 26'' through the restricted orifice 26'.

The torque element 61' is adapted to be rigidly connected to a conventional torque tube, such as indicated at 63. For this purpose the torque tube may be welded, soldered or otherwise rigidly and permanently secured to the torque element 61'.

The construction just described will serve to cushion shocks which would otherwise be transmitted from the torque tube 63 through the torque element 61' directly to the universally adjustable torque transmitting element 26'. In use the chamber 26'' and 61''' will be packed with a suitable lubricant, such as grease. The result of this is that when forces are set up in the direction of the double arrow S relative shocking motion between the torque element 61' and the member 20' will be cushioned.

Grease will be forced through the restricted orifice 26' in the direction of the chamber 61''' or the chamber 26'' in accordance with the direction of the force S.

The construction just described has been found particularly advantageous in combination with the propeller shaft of a motor vehicle. Tests have proved that propeller shafts equipped with this shock absorber or cushion construction result in a much smoother ride than when this structure is omitted.

The foregoing detailed description has been given for clearness and understanding only, and no unnecessary limitation should be understood therefrom, but the appended claim should be construed as broadly as permissible in view of the prior art.

What I claim as my invention is:

In a universal joint comprising a cup member having diametrically opposed apertures therein and having substantially flat surfaces surrounding the apertures at the inner sides thereof, a member having laterally spaced arms forming opposed substantially parallel flat surfaces and having a transverse portion connecting the arms at the free ends of the latter, the arm portions of the member extending into the cup member, a pin spanning the laterally spaced wall portions of the arms and having the opposite ends rotatably mounted in apertures respectively formed in the arms, said pin having a center portion provided with flat opposed surfaces extending substantially parallel to the surfaces aforesaid on the cup member, a second pin received at its ends in the apertures formed in the cup member and having an intermediate portion extending through an aperture formed in the flattened central portion of the first pin, rollers freely rotatably mounted on the second pin at opposite sides of the flattened central portion of the first pin and having a rolling engagement with the opposed substantially parallel flat surfaces on said arms, the opposite sides of the flattened central portion of the first pin cooperating with the flat surfaces on the cup member to hold the rollers against shifting movement axially of the second pin.

ANTON F. GREINER.